Figure 17:
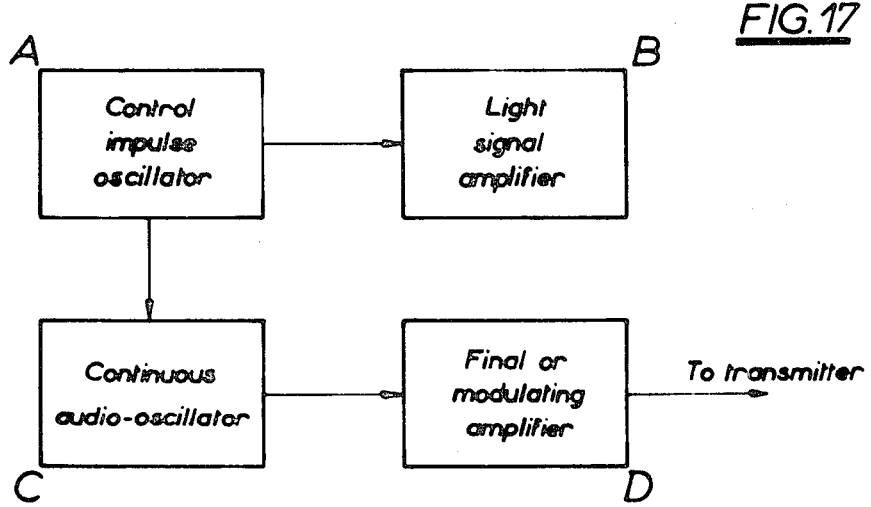

United States Patent
Da Silva

[15] 3,646,508
[45] Feb. 29, 1972

[54] AUTOMATIC SIGNALING DEVICE FOR AUTOMOTIVE VEHICLES

[72] Inventor: Jacinto Rocha Da Silva, Quinta das Pousadas, Vagos, Portugal

[22] Filed: June 12, 1968

[21] Appl. No.: 736,508

[30] Foreign Application Priority Data

June 3, 1968 Portugal...................................47 882

[52] U.S. Cl....................................340/33, 325/16, 325/22, 325/117
[51] Int. Cl. ...........................................................G08g 1/00
[58] Field of Search ....................340/33, 34, 32; 325/16, 21, 325/116, 117, 22

[56] References Cited

UNITED STATES PATENTS

| | | | |
|---|---|---|---|
| 2,475,578 | 7/1949 | Halstead | 325/22 |
| 3,210,726 | 10/1965 | Copsy | 340/33 |
| 3,233,217 | 2/1966 | Bost | 340/33 |
| 3,371,278 | 2/1968 | Gelushia et al. | 340/32 X |

*Primary Examiner*—William C. Cooper
*Attorney*—Steinberg & Blake

[57] ABSTRACT

A system for receiving and transmitting signals, to be used with automotive vehicles. A receiver is provided for receiving radio signals transmitted through the atmosphere. Also a transmitter is provided for transmitting radio signals through the atmosphere from the vehicle. In addition, an illuminating device is provided for providing a visual signal. A selector switch is available to the operator of the vehicle for selecting either an operation wherein signals are received by the radio receiver or an operation wherein signals are transmitted from the illuminating device and the transmitter. When providing the visual signal and transmitting signals, a plurality of programs are provided according to which the illuminating structure and transmitting structure are operated in a predetermined sequence to provide intermittent signals at both of these structures. The selecting switch can be placed in a selected one of a number of positions selecting a given program when the illuminating structure and transmitter structure are used.

22 Claims, 18 Drawing Figures

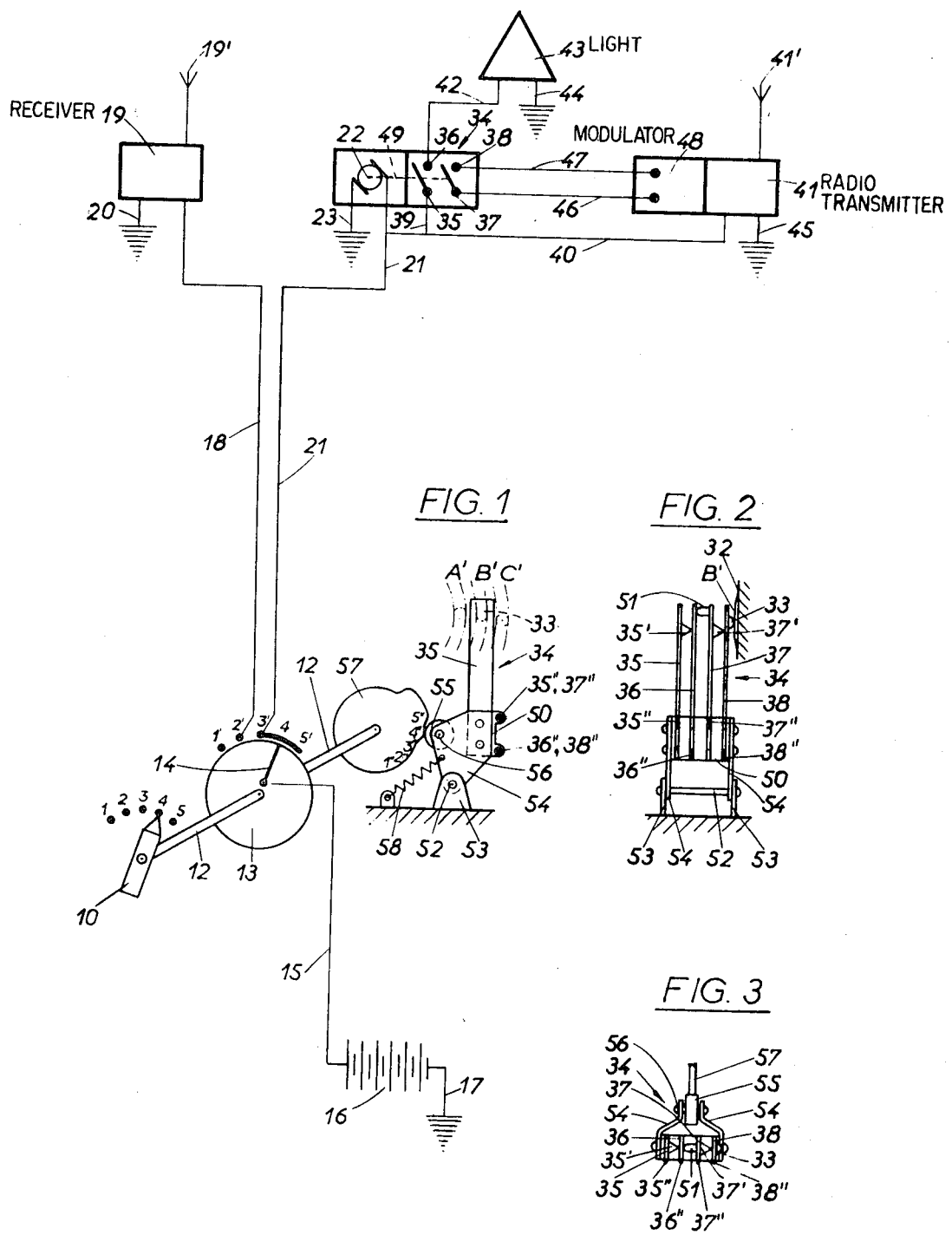

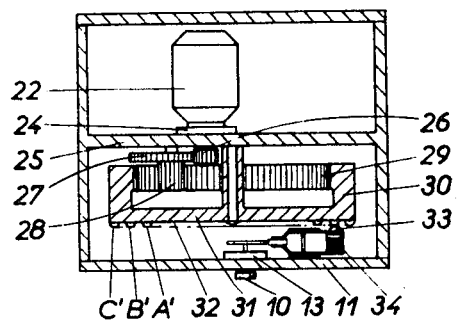
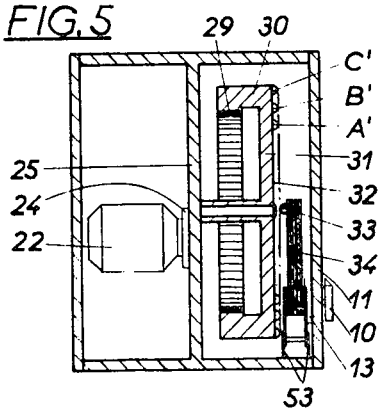
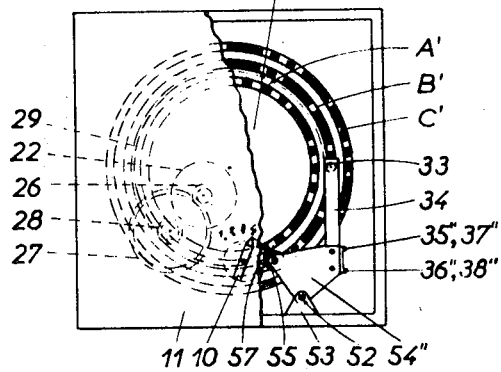
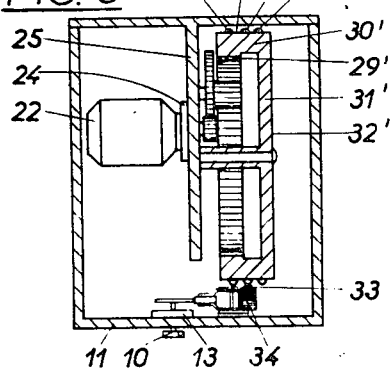
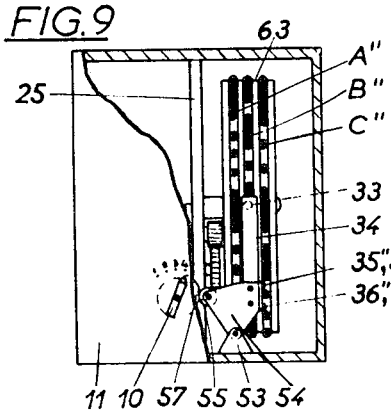
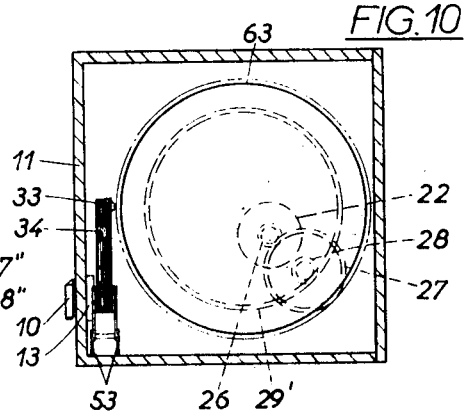

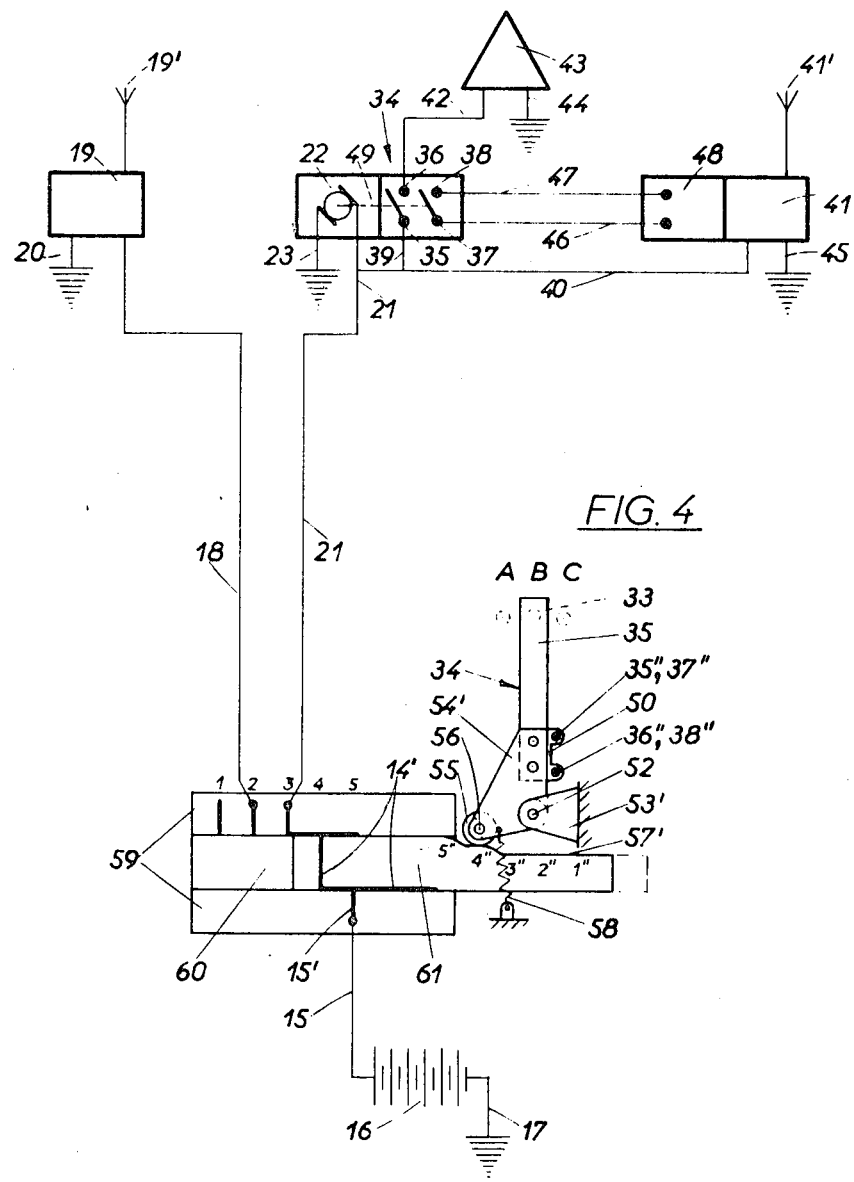

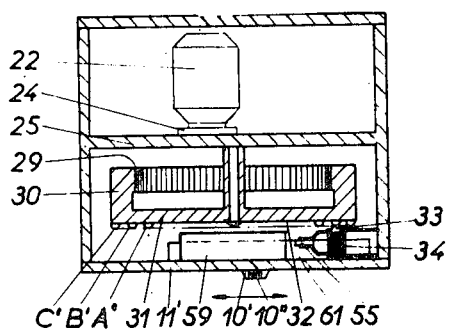
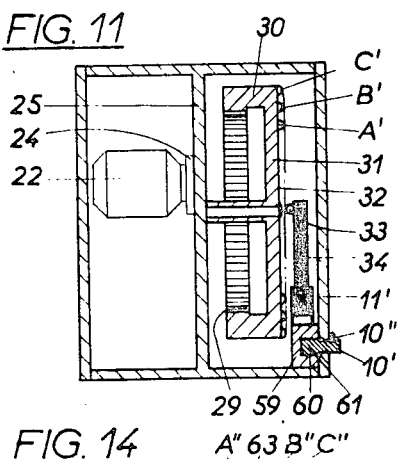
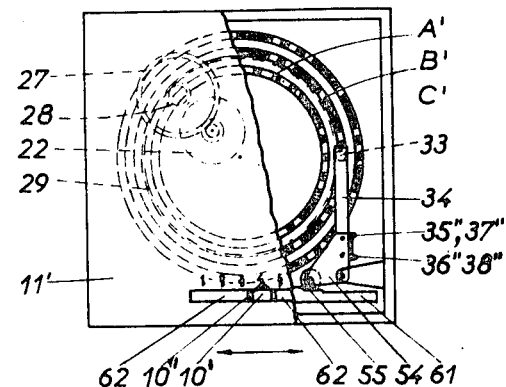
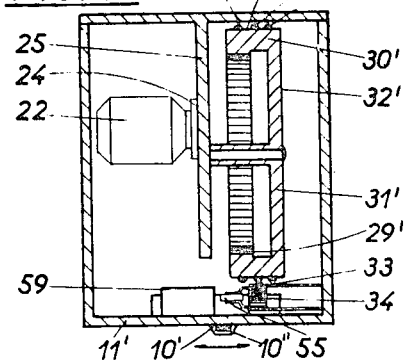
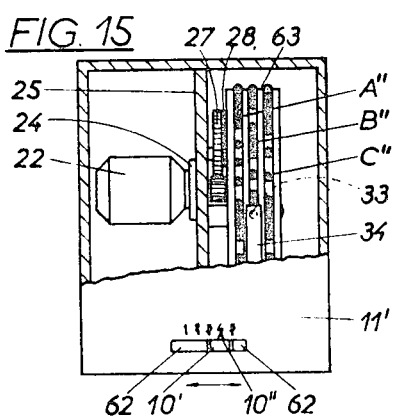
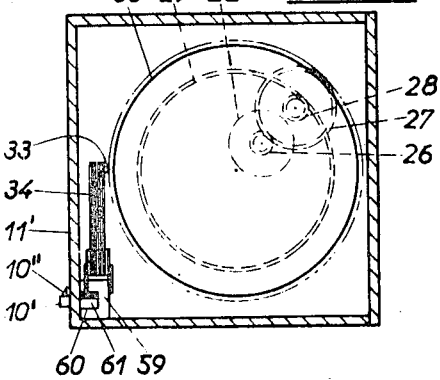
INVENTOR
JACINTO ROCHA DA SILVA

AUTOMATIC SIGNALING DEVICE FOR AUTOMOTIVE VEHICLES

This invention relates to an automatic signalling device for automotive vehicles, which calls the attention of other drivers, and more specifically to an electric device which transmits automatically warning signals, i.e., optical signals and radio signals which may be seen by the drivers of other cars and, respectively, received and heard by the same when their cars are equipped with suitable receivers for the used radiofrequency.

Already known is the simple warning sign in the form of a triangle of reflecting material, whose use is obligatory in the cases when a car, owing to some defect, stands stopped in a place where parking normally is prohibited and where generally hindrance is caused to the traffic. The big disadvantage of these warning triangles, as is generally know, is that they mostly are not placed "upstream" at a certain distance from the stopped car, i.e., the distance prescribed by the traffic regulations, owing to the risk of theft of the triangle sign in the absence of the driver. The difference between the theory of the law and the practice of this circumstance forces the drivers in this situation to place the signalling triangle within the car, visible behind the windshield or the rear window, and in this place the triangle obviously does not serve as a prewarning signal.

Further, the triangular sign in its known form can not serve to call attention of other drivers — besides, it was never designed for this purpose — when a car, come off the road and partly wrecked, comes to rest in a place which is usually not seen by other drivers, and needs help.

The present invention eliminates the above-mentioned disadvantages and imperfections, and provides a signalling device that not only calls forcibly the attention by means of warning signals when the car remains stopped in a street or on a road in an abnormal way which may hinder the traffic, but also when the vehicle has got off the road, and stands or lies in a place invisible to other drivers. Either with the driver staying in the car, or when the driver abandons it, the signalling device according to this invention warns continuously and automatically the traffic by means of an optical signal and a radiofrequency signal.

The optical signal is given by a luminous warning sign — for instance in the form of a lighted triangle, consisting of a case with a frosted glass pane inside which an electric bulb is burning, fed by the car battery — and the radiofrequency signal consists of a Hertzian wave which is modulated — either in amplitude or in frequency — with a constant audiofrequency, so that an audible signal is heard when received in a suitable receiver.

The apparatus of which each automatic signalling device according to the invention consists, comprises a transmitter as well as a receiver using a certain radiofrequency whose use is allowed to the owners of cars equipped with this signalling system. The drivers of these cars, when driving the car in normal circumstances, will have switched on the receiver belonging to the device, which normally will not produce any sound — thus not hindering the normal use of the car radio — but will warn automatically as soon as the car comes within a certain predetermined range — dependent on the power of the transmitters of the device — of a car that is transmitting a signal of the same radiofrequency as is used by the owners of the signalling device of this invention.

Both signals — the light signal given by the lighted sign and the radiofrequency signal transmitted by the transmitter of the device — are produced at the same time, fed by the car battery and controlled by the same element, though having separate circuits. This control element may be — in a first embodiment of the invention — an electromechanical device known as a "program switch" and comprising a small geared-up electric motor, also fed by the car battery and driving a cam disc, whereby the cam actuates a secondary switch which rhythmically interrupts the current flowing in two separate circuits. In another embodiment, said control element consists of a combined electronic circuit comprising four transistors, each in a subcircuit. One of these subcircuits, a control impulse oscillator, produces signal impulses comparable with those of a Morse telegraph system. These control impulses feed an amplified circuit for the feeding of the illuminated warning sign. The first subcircuit feeds also a continuous oscillator for the audible signal. This circuit, equally transistorized, produces, during the periods of the controlling impulses given by the first mentioned transistorized control impulse oscillator an audiofrequency, thus forming a signal consisting of impulses of an audible frequency. This signal is, finally, multiplied in a transformer and lead to a fourth transistorized subcircuit, i.e., the final or modulating amplifier, whose output feeds the transmitter forming part of the signalling device of this invention.

The rhythmic alternation of current impulses and interruptions produce in the light signal a flickering effect which enhances considerably its warning potentiality. The simultaneous interruptions in the feeding of the radiofrequency signal may be interruptions in the carrier wave — producing what is known as marking waves and spacing waves — or interruptions in the modulating signal, as in radio transmission. Since the interruptions and impulses of the visible light signal and of the audible radio signal are perfectly simultaneous, this will help considerably when a search is carried out for a car which has got off the road in the dark, and is transmitting a coded call for assistance.

The program switch, forming the electromechanical means of controlling the rhythmic impulses, according to the first embodiment of this invention, feeds, as was pointed out above, both the light signal circuit and the radiofrequency signal circuit. It comprises a cam disc with various cam tracks, each representing a different signal code which may be chosen manually. These codes may correspond with certain signals of the known "Morse" telegraph system or may be special particular codes, to be used only by the group of drivers whose cars are equipped with transmitters and receivers according to this invention.

The same manual selection is possible in the case of electronic generation of the signal impulses. In the first, and as well in the second embodiment of the invention, this selection of the type of code to be transmitted, or of the frequency of the signal impulses of the same, is made by means of a hand switch which forms a part of the device of the invention, and which may have the form of a rotary switch, press keys or buttons or a sliding switch, according to the preference of the constructor when considering the most suitable or most esthetic presentation of this control element. This switch will be mounted on the control box which, in its turn, will preferably be located below the instrument panel of the car. This manual switch serves as well for disconnecting the signalling device from the current furnished by the car battery, as for selectively connecting the receiver or the transmitter, and finally also for choosing the signal code to be transmitted, or the frequency of the signal impulses of the same. According to these two functions, the hand switch comprises a section functioning as main switch and a section functioning as selector switch which may work mechanically — as in the first embodiment of the invention — or purely electrically, as in the second embodiment.

Figure 18:
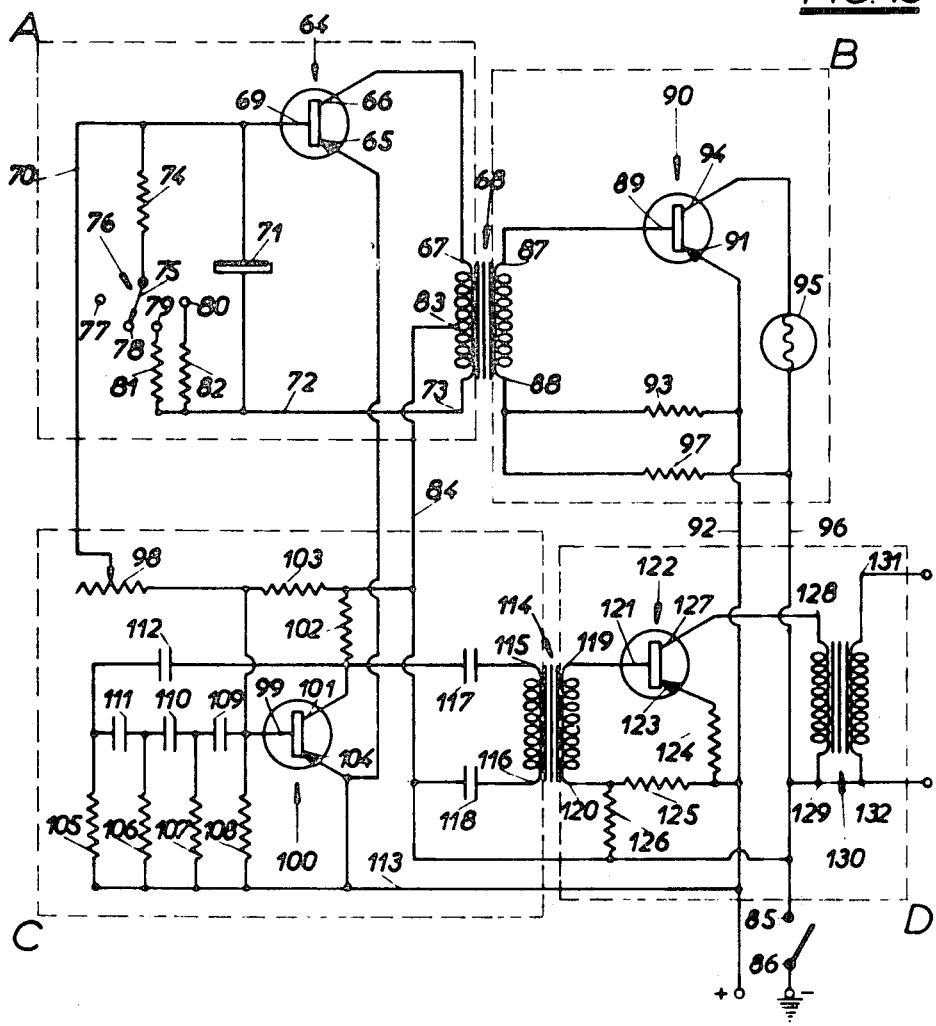

The characteristics and the working of the automatic signalling device according to this invention will be more clearly understood from the following detailed description wherein specific reference is made to the accompanying drawings of which:

FIG. 1 shows, in its upper part, a scheme of the electric connections of the embodiment with an electromechanical control element, and the lower part of the drawing shows, in perspective, the rotary selector switch and, in a front view, the secondary switch, FIG. 2 is a side view of the secondary switch, FIG. 3 is a top view of the secondary switch, FIG. 4 repeats in its upper part of the scheme of the electric connections given in FIG. 1 for the first embodiment of the invention, but the electromechanical control element has the form of a sliding selector switch, schematically shown, FIG. 5 shows a cross section through the control box of the first embodiment of the automatic signalling device of the invention, showing the cam disc of the electromechanical control element with its laterally placed cam tracks and a rotary selector switch, schematically shown, FIG. 6 is a horizontal section through the control box and the cam disc shown in FIG. 5, FIG. 7 is a front view of the same control box with its front wall partially cut away, showing the three cam tracks and the secondary switch, FIG. 8 is a horizontal section through a control box equipped with a cam disc having cam tracks on its cylindrical surface, showing the disc in cross section, FIG. 9 is a front view of the control box shown in FIG. 8, with its front wall partially cut away, showing the three cam tracks and the secondary switch, FIG. 10 is a longitudinal section through the same control box, FIG. 11 is a cross section through still another modification of the electromechanical control box, showing schematically the same cam disc as shown in FIGS. 5 to 7, with lateral cam tracks, and a sliding selector switch, FIG. 12 is a horizontal section through the control box and the cam disc shown in FIG. 11, FIG. 13 is a front view of the same control box with its front wall partially cut away, showing the three cam tracks and the secondary switch, FIG. 14 is a horizontal section through a fourth modification of the control box equipped with a cam disc as shown in FIGS. 8 to 10 having cam tracks on its cylindrical surface, and with a sliding selector switch as shown in FIG. 11, FIG. 15 is a front view of the control box shown in FIG. 14, with its front wall partially cut away, showing the three cam tracks and the sliding selector switch, FIG. 16 is a longitudinal section through the same control box, FIG. 17 is a schematic diagram showing the four subcircuits forming together the electronic means for the signal generation; and FIG. 18 is a detailed scheme of the electric connections corresponding to the schematic diagram shown in FIG. 17.

First there is a detailed description of the embodiments having an electromechanical control element for the signal impulses. With special reference now to FIG. 1, the knob of the rotary selector switch is indicated by the numerical reference 10. This knob may occupy 5 different positions, indicated 1 to 5, as will be seen in FIG. 1, and since this knob 10 is mounted on the front wall or panel 11 of the control box, these references 1 to 5 may suitably be indicated on this front panel, as is seen in FIGS. 7 and 9. The shaft 12 of the rotary selector switch actuates — as is schematically shown in perspective in the lower part of FIG. 1 — the contact disc 13 on which is fixed the contact finger 14 which is electrically connected through the wire 15, with one of the poles — for instance the positive pole — of the car battery 16. The other battery pole, i.e., the negative pole is connected to the ground of the car by means of the wire 17. The contact finger 14 may touch one of the fixed contacts 1' to 5' of the rotary switch, located in the same plane as the contact disc 13, corresponding to the position of the switch knob 10. The fixed contact 1' has no electrical connection and thus there is no connection with the battery 16 in position of of the rotary switch. The fixed contact 2' gives connection, by means of wire 18, to the receiving unit 19 belonging to the automatic signalling device of the invention, and this receiver 19 is connected to ground by means of wire 20.

The fixed contacts 3', 4' and 5' are permanently interconnected, so that the contact finger 14 establishes, in any of the positions 3, 4 or 5 of the knob 10, a connection with wire 21 which feeds the geared motor 22 whose other terminal is grounded by means of wire 23.

Referring now to FIGS. 5, 6 and 7, the driving of the cam disc of the aforementioned "program-switch" by means of the geared motor 22 will be described. As will be seen in FIGS. 5 and 6, the geared motor 22 is mounted within the control box, for instance by means of its flange 24 which may be screwed on to a partition wall 25 of the box. The end of the motor shaft protrudes through the partition wall 25 and bears a driving pinion 26 which meshes with the teeth of the intermediate gear wheel 27 which turns about a short shaft fixed on the partition wall 25. This intermediate gear 27 forms one piece with a toothed pinion 28 which meshes with the teeth on the cylindrical interior surface 29 of the cylindrical rim 30 of the cam disc 31 which also turns about a short shaft fixed on the partition wall 25. The toothed pinion 26 drives thus, by means of these intermediate gears, the cam disc 31 with a double reduction whose total reduction factor, together with the number of rotations of the electric motor 22, is chosen so as to permit that the impulses and interruptions of the current, feeding the light signal and the radio signal, have a convenient frequency, i.e., so that the individual impulses may be clearly distinguished one from another. The chosen form of a geared reductor has proven, in practice, to be the most suitable for the driving of this electromechanical unit. However, a reduction working with friction wheels made of suitable materials might also be considered without departing from the scope of this invention.

In FIGS. 5 to 7 it may be seen that the cam disc 31 is equipped, on its plane side surface 32, with three code cam tracks A', B' and C', located concentrically with respect to each other. Each of these tracks consists of a series of protruding cams which may dislocate, in a sense perpendicular to the side face 32 of the cam disc 31, the cam follower button 33 of the secondary switch 34.

This secondary switch 34, also shown schematically in the upper part of FIG. 1, comprises two separate single pole switches consisting of the contact strips 35, 36, 37 aNd 38. The contact strip 35 is connected, by means of wire 39, to the branch 40 of wire 21 which connects the fixed contact 3' of the rotary switch 13 to the radio transmitter 41, forming part of the equipment of the device of the invention. The contact strip 36 of the secondary switch 34 is connected by means of wire 42, to the light signalling device 43 which preferably has the form of a triangular housing which may be located within the car near its rear window or windshield. The light signalling device 43 is grounded with wire 44. The transmitter 41, fed by branch wire 40 is grounded by wire 45.

The second pair of contact strips of the secondary switch 34 is connected in a separate circuit, i.e., that which controls the radiofrequency signal. The contact strips 37 and 38 of this switch are connected, through wires 46 and 47 respectively, to the modulating unit 48. This modulator 48 may include its own separate energy source, in the form of dry cells of 1.5 volts, or any other voltage different from that of the car battery 16, and in this case the circuit 46, 47 is connected to the modulator 48 in such a way that the switch 37, 38 may break the connection with said separate source of energy. When, however, the modulator 48 may be fed with a voltage of 6 volts, this unit would be more suitably fed directly from the car battery 16. In this case, the contacts 37, 38 may be omitted, whereby wire 47 is connected to contact strip 36 and wire 47 to earth, and the secondary switch 34 in this case comprises only one pair of contact strips 35, 36. The modulator 48 generates an audiofrequency which, when the switch 37, 38 is closed modulates the carrier wave which is generated in the radio transmitter 41 and transmitted by the same, through the antenna 41'. In case that the transmitter 41 is a telegraph transmitter, the unit 48 will be incorporated therein, whereby the circuit 46, 47 with the switch 37, 38 serves to interrupt the carrier wave, thus producing marking waves alternating with spacing waves, as is known in conventional radiotelegraphy. In the symbolic representation of the secondary switch 34 in the schematic upper part of FIG. 1, the reduction gearing 26 to 29 and the actuating mechanism of the secondary switch 34 comprising the cam disc 30 to 32 are symbollically indicated by the dash line 49.

Referring now specially to FIGS. 2 and 3, the secondary switch 34 including its two separate circuits 35, 36 and 37, 38 has the form of a laminated switch of a known type. The four contacts 35 to 38 are formed of electrically conducting and elastic metallic strips, for instance of phosphor-bronz, fixed with their lower ends (FIG. 2) in a block 50 if insulating material which comprises a quantity of shims of insulating material placed between the metallic contact strips, so that these contact strips remain electrically isolated one from another. The lower part of each strip, fixed in the block 50, has a protruding connecting terminal 35'', 36'', 37'', 38'' (FIGS. 1 to 3). Flexible wires connect these terminals to the fixed part of the wiring system 39, 42, 46, 47, respectively. One of the contact strips placed on the end of the block 50, for instance the strip 38, bears the cam follower button 33 engaged by the protruding cams of one of the cam tracks A', B' or C' (FIGS. 1 and 7). When one of the protruding cams of a track displaces the cam follower button 33 in a sense perpendicular to the plane of the cam track, (in FIG. 2 to the left), the contact strip 38 touches the contact point 37' of strip 37, closing thereby in the first place the contact 37, 38 which belongs, securing to the upper part of FIG. 1, to the circuit 46, 47 of modulating unit 48. The movement to the left of the strip 38, touching the contact point 37', pushes also the strip 37 to the left. This strip 37 bears, on its upper end (FIG. 2), a spacer 51 of insulating material which touches the contact strip 36 and pushes it also to the left. This strip 37 bears, on its upper end (FIG. 2), a spacer 51 of insulating material which touches the contact strip 36 and pushes it also to the left. This strip 36, in its turn, touches the contact point 35' of strip 35, closing the contact 35, 36 in the feeding line 42 of the light signalling device 43. As soon as the cam of the cam track on disc 31 leaves the cam follower button 33 free, the elasticity of the material of the strips 35 to 38 opens the contacts 35', 36 and 37', 38, disconnecting at the same time both circuits.

The sequence of the periods of contact and their intervals depends obviously on the sequence of the cams in each cam track A', B' or C', and each cam track may represent any signalling code, either special or conventional — for instaNce corresponding to the Morse system.

The secondary switch 34 should be able to occupy selectively the different positions permitting the cam follower button 33 to follow the cams of each of the tracks. To this end, the unit forming the secondary switch 34 could be mounted in a way permitting its oscillating about a pivot pin 52 mounted in fixed supports 53 existing in the control box or in its frame. The insulating block 50 includes also two insulated side wings 54 which are rigidly fixed to the block, and support between them a cam roller 55 whose axle 56 is parallel to the axis of the pivot pin 52 of the unit of the secondary switch 34.

The shaft 12 of the main rotary switch 13 bears also, as may be seen in the lower part of FIG. 1, a controlling cam 57 in the form of a noncircular disc, rigidly and perpendicularly mounted on the shaft 12. The plane of the controlling cam 57 coincides with that of the cam roller 55, the shaft 12 of the rotary switch 13 is parallel to the shaft 52 and 56 of the secondary switch 34, and the cam roller 55 touches the periphery of the controlling cam 57 under the action, for instance, of a spring 58.

The periphery of the controlling cam 57 is composed of three circular arcs of different radii. When the knob 10 of the rotary switch 13 is in position 1, 2 or 3, the cam roller 55 touches respectively the sections 1'', 2'' or 3'' of the controlling cam 57 (see the part shown in perspective in the lower half of FIG. 1), whereby these sections form a part of the circular arc of the smallest radius. In position 4, section 4'' of intermediate radius touches the cam roller 55, and in position 5 the section 5'' with the biggest radius. The dimensions of the cooperating parts are chosen as to the position the cam follower button 33 of the secondary switch 34 on the cam track A' when the rotary switch 13 is in position 1, 2 or 3, on the track B' in position 4 and on track C' in position 5.

The parts described until now will work in the following manner: with the main rotary switch 13 in position 1, all of the installation of the signalling device of the invention is disconnected from the car battery. With the rotary switch 13 in position 2, which will generally be the case when the car is driven in normal circumstances, the receiver 19 is connected, enabling the driver to hear possible signals transmitted by other cars. In case that the drive of the car needs to transmit a signal according to the code produced by the cam track A', he places the knob 10 in position 3, thereby disconnecting the receiver 19 and, at the same time, connecting the geared motor 22 of the electromechanical program-switch, and also contact 35 of the feeding circuit 42 of the light signalling device 43 and branch wire 40, feeding the radio transmitter 41. The geared motor 22 puts the cam disc 31 in rotation and the cams of track A' will actuate the secondary switch 34 which is located with its cam follower button 33 over this cam track. If it is necessary to change the transmitted signal for the code of track B' or C', the knob 10 of the rotary switch 13 should be placed in position 4 or 5 respectively, shown in the various drawings. The electric connections remain the same with the controlling cam 57 changing the position of the secondary switch 34 to the cam track B' or C'. The changing of the position of the cam follower button 33 from one cam track to another, moving thereby transversally to the direction of the cam tracks, can normally not occur without the cam disc 31 with its cam tracks being in rotary movement — since during all changes of position of the rotary switch 13 between positions 3 and 5, the driving motor 22 remains connected to the current and the cam disc 31 remains in rotation — which facilitates the transversal movement of the cam follower button 33.

FIG. 4 is similar to FIG. 1. Its upper part shows the same electric diagram as shown in the upper part of FIG. 1, whereby the same reference numerals have been used. The lower part of the drawing, however, shows a main selective switch of the sliding type, cooperating with as oscillating secondary switch whose frame is slightly altered, so that the same parts are indicated by the same numerical references, while different but similar parts have the same reference numerals provided.

The sliding selective switch has a fixed part or casing 59 (FIGS. 4, 11 and 16) provided with a groove 60 in which a contact slider 61 may move. Both the casing 59 and the slider 61 are made of insulating material. The contact slider 61 bears a contact strip 14' of conducting material in L-shaped form as may be seen in FIG. 4. The basis of the L extends along the lower long side (FIG. 4) of the slider 61, and it remains in all positions of the slider 61 in touch with a fixed contact 15' provided with a terminal, fixed on the lower part of the fixed casing 59 and connected, through wire 15, to the positive pole of the car battery 16. The contact slider 61 may occupy five positions in the switch casing 59, whereby these positions are fixed by known means not shown, for instance, five shallow holes existing in the slider 61, in which may enter a steel ball under the pressure of a spring, located in the fixed part of the casing 59. The slider 61 is provided with a knob 10' which protrudes through a slot 62 (FIG. 15) in the front panel 11' of the control box, so that it may be actuated by the fingers. This knob may be provided with a small indicator 10'' which indicates 5 markings according to the positions the slider 61 may occupy, whereby these markings are visible on the front panel 11' as may be seen in FIGS. 13 and 15. The five positions which the leg of the L of contact strip 14' may occupy are indicated in FIG. 4 also with the references 1 to 5. In position 1, the leg of the L does not make any electric connection, and the whole signalling device is in this position disconnected from the car battery 16. In position 2, the leg of the L touches a fixed contact through which wire 18, feeding the receiver 19, is connected to the wire 15 of the positive battery pole.

The contacts 3, 4 and 5 have also the form of a conducting metal strip of L-shaped form. In positions 3, 4 and 5, the leg of contact strip 14' touches the base of the fixed contact 3, 4, 5 and thus connects with wire 21 which feeds the remaining part of the device, as already has been described before. The 5 positions of the contact slider 61 produce, therefore, the same electric connections as the 5 positions of the rotary selector switch described before.

A prolonged part of the slider 61, which protrudes longitudinally from the switch casing 59, has sections of different width. As will be seen in FIG. 4, where the slider 61 is shown in position 4 — just as in all other drawings of this patent specification — the extreme part of the slider 61 has the smallest width and comprises the sections 1'', 2'' and 3'', from right to left. After that comes section 4'', with a bigger width, on which the cam roller 55 is shown to be resting, and going still further to the left, the section 5'', remaining in FIG. 4 within the casing 59, has a width still bigger than that of section 4''. The cam roller 55 of the oscillating secondary switch 34 is mounted in such a way, that its plane coincides with that of the contact slider 61, and the cam roller 55 touches the upper side of the various sections 1'' to 5'' of the slider 61 under the pressure of the spring 58. The secondary switch 34 is the same as described before, with the exception of the side wings 54' and the supports 53' which have a slightly different form. When the knob 10' of the contact slider 61 is placed in positions 1, 2 or 3, the cam roller 55 touches respectively the sections 1'', 2'' or 3'' of the extreme part of the slider 61, in position 4 the roller 55 touches the section 4'' of intermediate width, and in position 5 it touches the section 5'' of maximum width. The dimensions of the various cooperating parts locate in positions 1, 2 and 3 of the sliding selector switch, the cam follower button 33 of the secondary switch 34 over the cam track A', in position 4 over track B' — as is shown in all drawings — and in position 5 over cam track C'.

While FIGS. 1, 2 and 3 give details of the rotary selector switch 13, and FIG. 4 schematically explains the sliding selector switch 59 to 61, which may be used as an alternative modification, FIGS. 5, 6 and 7 do not need explanations. These drawings indicate, schematically, an application of the rotary selector switch in a control box including a cam disc 30 to 32 as described before, having a number of cam tracks concentrically located on the plane lateral side face of the disc. FIGS. 11, 12 and 13 show equally an application of the sliding selector switch in a control box including a cam disc of the same type. In both these cases, the actuating knob 10 or 10' is mounted on one of the walls or panels of the box which is situated parallel to the plane disc, and, in order to obtain easy access of the actuating knob for the driver of the car, this control box may be suitably mounted below the instrument panel of the car, for instance, with the axis of rotation of the cam disc in the longitudinal direction of the car.

FIGS. 8 to 10 and 14 to 16 show still other modifications of the control box pertaining to the first embodiment of the signalling device of this invention. In these cases, the cam disc is formed differently and has its cam tracks A'', B'' and C'' located on the cylindrical outer surface 63 of the cylindrical rim 30' of the disc. The three cam tracks A'', B'' and C'' have in this case the same diameter and may slide tangentially along the cam follower button 33 of the oscillating secondary switch 34. The pivot pin 52 of this oscillating switch unit 34 is now positioned perpendicularly to the axis of rotation of the cam disc, and the actuating knob 10, 10' of the selector switch is located in one of the small walls of the control box. The control box will, in these cases, be mounted — for instance below the instrument panel of the car — with the axis of rotation of the cam disc transversally positioned to the longitudinal direction of the car. FIGS. 8 to 10 shown an application of the rotary selector switch with the cam disc 30' to 32', and FIGS. 14 to 16 show schematically a control box equipped with a sliding selector switch according to FIG. 4, in combination with the same cam disc as shown in FIGS. 8 to 10.

Possibilities of locating of the control box, to be used for the first embodiment of the signalling device of this invention, have already been shown. As to the receiving unit 19 and the modulating unit 40, 41, these may be located in a manner similar to known feeding units of certain makes of autoradios. The antennas 19' for receiving and 41' for transmitting, shown as separate elements in FIGS. 1 and 4, will in reality be one and the same antenna, alternatively connected to the receiver or the transmitter, or permanently coupled, in an inductive way, to both these units. The light signalling device 43 will suitably form a separate unit, provided with a flexible cord of some meters in length, including the two conductors 42 and 44 and ending in a two-pole plug, to be received in a socket which may be mounted on the control box, or ending in terminals which are permanently connected to the box. The length of the flexible cord will allow a location of the light signalling device even outside the car, if necessary.

Two modifications of the main selector switch have now been described, as well as two modifications of the cam disc, both belonging to the electromechanical control element and together providing four combinations of structural variations of this control element, according to the first embodiment of the signalling device of this invention. In the following paragraphs will be given a description of the second embodiment of the signalling device, including an electronic control element, with special reference to FIGS. 17 and 18.

In FIG. 17 is schematically indicated how the electronic control element is to be considered as being subdivided into four main units, which are together located in a control box of reduced dimensions, having also a knob for a rotary switch or a sliding switch, and being similarly located below the instrument panel of the car. It will be clear, that the total absence of moving mechanical parts inside the control box not only reduces its overall dimensions but also the cost involved in its manufacture, while the same absence of moving parts enhances considerably the reliability of its working.

The unit indicated in FIG. 17 by A constitutes the transistorized oscillator which generates the impulses that will control the working of the light signal amplifier B and that of the continuous audio-oscillator C. The output of this audio-oscillator C, providing an audio signal in the form of impulses generated in the oscillator A, is amplified in the final or modulating amplifier D from where it is fed to the radio transmitter 41.

In FIG. 18 the detailed electric scheme is shown as schematically subdivided into the same 4 units A, B, C and D corresponding to those of FIG. 17, whereby the 4 rectangles, shown in dashlines, each include the components of each unit. The control impulse oscillator A comprises a transistor 64 which may be, for instance, a PNP of type Oc 74. Its emitter 65 is directly connected to the positive side of the feeding current, which, in the example shown, is provided by the car battery 16, for instance a 12 V battery. The collector 66 of transistor 64 is directly connected to the end 67 of the primary winding of a transformer 68. The base 69 of the transistor 64 is connected, through the wire 70, to the condenser 71 whose other pole is connected, through wire 72, to the other end 73 of the primary winding of the transformer 68. The condenser 71 is, in the example shown, of the order of 25 mf. To the wire 70 is also connected a resistor 74, in the example shown of a resistance of $3K_3$, whose other end is connected to the moving contact finger 75 of the selector switch 76. A section of the selector switch 76, shown in the rectangle of the control impulse oscillator A, comprises a contact 77, without connection, serving to disconnect the whole signalling device from the car battery. The contact 78 is also shown without connection, but in this position of the switch another section of the same connects the receiver 19 of the device to the car battery, and this position corresponds to position 2' of the rotary switch 13 shown in FIG. 1. The remaining positions 79 and 80 of the selector switch, as shown in FIG. 18, are positions similar to those marked 3', 4' and 5' in FIG. 1. In positions 79 and 80, the moving contact finger 75 is connected with wire 72 through the resistors 81 and 82, respectively. In the example shown, the resistor 81 may have a resistance of 100K, and the resistor 82 a resistance of 33K. The oscillatory circuits, closed respectively by 75, 79 or 75, 80 produce different frequencies, i.e., circuits 75, 79 with resistor 81 of 100K generates slow impulses, while circuit 75, 80 with resistor 82 of 33K generates quicker impulses. The feeding of the control impulse oscillator A is completed by wire 84 which connects the center tap 83 of the primary winding 67, 73 of the output transformer 68 to the contact 85 of the switch 85, 86 which connects it to the negative side of the car battery. The switch 85, 86 forms a section of the selector switch 76, and works in such a way, that the contacts 85, 86 are closed when the moving contact finger 75 of the selector switch 76 is in one of the positions 79 or 80. The contact 86 is connected to the negative pole of the car battery 16.

The control impulses, generated in the oscillator A, feed the primary winding 67, 73 of the transformer 68, and are transformed in the secondary winding 87, 88 of the same. The end 87 of this secondary winding is connected to the base 89 of the transistor 90, which is in the example shown also a PNP of type AC 128. The emitter 91 of this transistor 90 is also directly connected to the positive pole of the car battery 16 by means of the wire 92, and is connected to the end 88 of the secondary winding of the transformer 68 through the resistor 93 which is of the order of 33 ohm in the example shown. The collector 94 of the transistor 90 feeds the lamp 95 of the light signalling device which is, in the example shown, of the order of 0.05 ampere, 6 volts. This lamp 95 is, with its other pole, connected to the contact 85 of the switch 85, 86. The circuit of the amplifier B is completed by the resistor 97, which is, in the example shown, of the order of 5K.

The polarization of the base 69 of transistor 64 feeds, through wire 70 and potentiometer 98, the base 99 of transistor 100 which, in the example shown, is a PNP of type OC 71. The collector 101 of this transistor 100 is connected, through a resistor 102 — of 2K7 in this example — to the wire 84 while its base 99 is connected to the same wire 84 through a resistor 103, of 47K in the example shown. The emitter 104 of the transistor 100 is, as in the case of circuit A, directly connected to the positive pole of the car battery 16, and also to an oscillatory circuit consisting of the resistors 105 to 108 and of the condensers 109 to 112. The condensers 109 to 112 have, in the example shown, each a value of 100K, and are connected in series, and their electrodes are each connected to one end of each of the resistors 105 to 108. The resistors 105 to 107 have, in the example shown, a value of 1K, while the resistor 108 is of the order of 2K2. The opposed ends of the resistors 105 to 108 are connected to the wire 113, and by means of this to the positive pole of the car battery 16. The other electrode of the condenser 112 is connected to the collector 101 of the transistor 100. The continuous audio-oscillator C works thus with an audiofrequency of the order of 1,000 cycles per second, interrupted according to the frequency of the control impulses generated in the oscillator A, adjusted by the potentiometer 98 which is, in the example shown, of the order of 150K.

The output of the continuous audio-oscillator circuit C goes through the transformer 114, whose primary winding 115, 116 belongs to the circuit C. The end 115 of this primary winding is connected to a condenser 117 whose other end is connected to the collector 101 of the transistor 100. The end 116 of the same primary winding is connected, through the condenser 118, to the wire 84 which represents the negative side of the feed. Both condensers 117 and 118 are, in the example shown, of the order of 120K.

The secondary winding of the transformer 114 belongs to the final amplifier circuit D. The end 119 of this secondary winding is connected to the base 121 of the transistor 122, which is a PNP of type AC 128. The emitter 123 of this transistor 122 is connected, through a resistor 124 — of the order of 2,2 in the example shown — to the positive pole of the car battery 16. The other end 120 of the secondary winding of the transformer 114 is connected, through a resistor 125, to the same positive battery pole, and through a resistor 126 to the contact 85 of the switch 85, 86 at the negative side of the feed. In the example shown, the resistor 125 has a value of 33 ohm and the resistor 126 a value of 2K5. The collector 127 of the transistor 122 is connected to the end 128 of the primary winding 128, 129 of the output transformer, and the opposed end 129 of this primary winding is connected to the contact 85 of the switch 85, 86 at the negative side of the feed. The secondary winding of the transformer 130 is directly connected to the output terminals 131, 132 that feed the modulation signal to the radio transmitter 41 which generates the carrier wave, whereby the output terminal 132 also is connected to the negative side of the current supply, represented by the contact 85.

From the above description the working of the combined electronic circuit A, B, C, D is clear. The slow oscillations generated in the Control Impulse Oscillator A — oscillations whose frequency depends on the choice of the positions 79 or 80 of the selector switch — cause a periodic current flow through the primary winding 67, 73 of the transformer 68, resulting in a periodic polarization of the base 89 of the transistor 90 in the Light Signal Amplifier circuit B, and the lamp 95 of this signalling device will produce intermittent light signals whose impulses have the same frequency as that chosen by the selector switch 76. At the same time, the impulses of polarization of the base 69 of the transistor 64 in the Control Impulse Oscillator circuit A are transmitted to the base 99 of the transistor 100 in the Continuous Audio-Oscillator circuit C, which generates the audible signal. The audiofrequency here produced, which is in the present example of the order of 1 kc., has a continuous character but is only transmitted to the transformer 114 during the periods of polarization of the base 99 of transistor 100, i.e., this signal is transmitted intermittently in impulses having the same frequency as that chosen by the selector switch 76. The signal which is transmitted to the Final or Modulating Amplifier D is, therefore, formed by a sound of an audible frequency of about 1,000 cycles per second interrupted in impulses having the frequency chosen by means of the selector switch 76. In the Final Amplifier D this signal is amplified by the transistor 122 and by the transformer 130 and then fed to the transmitter 41, where the generated radiofrequency carrier waVe is modulated.

The automatic signalling device for automotive vehicles, according to this invention, has now been described in two embodiments, i.e., with an electromechanical control element and with an electronic control element for the generation of the signalling impulses. Of the first embodiment were described four combinations of two modifications of the central switch and two modifications of the cam disc. It will be evident, that various other modifications and variations may suggest themselves to those skilled in the art. For instance, in the first embodiment of the invention, the electromechanical control box may house a cam disc with any number of cam tracks different than is shown in the accompanying drawings, and accordingly, the various necessary positions of the secondary switch may be controlled by a controlling cam 57 whose periphery has a correspondingly different number of positions, or by a contact slider 61 with such a number of positions. The electric part of the selector switch 13 might be executed in still other ways, for instance in the form of three press keys or buttons representing the positions 1, 2 and 3 of the switch, while the choice between positions 3, 4 and 5 might be done by means of a rotary knob, whose rotation might then be blocked when the keys or buttons of positions 1 and 2 were pressed down, and free when the key or button of position 3 were pressed down. In this case, the key position 1 would be marked "disconnected" or "off," that of position 2 : "receiver" and that of position 3 : "transmitter." Only in this position could the cam disc turn, and so only in this position the mechanical rotary selector should be able to change over to another cam track, whereby its positions then would be marked : "code A," "code B," and "code C," or similar indications. Also the secondary switch may, within the scope of this invention, have other embodiments. The so-called microswitches, commercially for sale in various sizes, are suitable as a substitute for the laminated "telephone-type" contact strip switch 34, provided that they have two separate pairs of contacts. If a secondary switch should be applied of a type equipped with two commutator contacts instead of only one contact 38 — this could be either a switch of the "laminated" type or of the "microswitch" type — the circuit 46, 47 could include two alternating wires 47' and 46'', fed respectively when the cam follower button 33 is dislocated by one of the cams of a cam track, and in an interval between two cams, and each wire 47' and 47'' might feed a different audiofrequency modulator, which would produce an audible signal consisting of two alternating different tones, enhancing considerably its attention-attracting properties.

As to the second embodiment of the automatic signalling device, i.e., with the electronic control element for the generation of the signalling impulses, it will be evident that also in this case the number of positions 79, 80 of the main selector switch might be different, each position corresponding to a different resistor 81, 82 and producing different low frequencies for the control impulses. Also in this second embodiment of the device of the invention, the main selector switch might be of the sliding type or may be executed with press keys or buttons. All numeric values in the described examples of construction might be changed without departing from the principle of the electronic signal controlling element. 38—

Accordingly, it is to be considered that all above-mentioned changes, alterations and modifications and still others of the same nature could be made without departing from the spirit and scope of the invention. It is therefore intended, that all matter contained in the above description or shown in the accompanying drawings shall be interpreted as being illustrative and not in a limiting sense.

Having described my invention, what I claim as new and desire to secure by Letters Patent is:

1. A signal sending and receiving system for automotive vehicles, comprising radio receiver means for receiving radio signals, radio transmitter means for transmitting radio signals, illuminating means for providing visual signals, a plurality of program means coacting with said illuminating means and transmitting means for energizing both of the latter two means to provide intermittent visual and radio signals according to predetermined programs, respectively, and selector means coacting with said receiver means and with said plurality of program means for selecting either an operation wherein signals are received by said receiver means or an operation wherein signals are transmitted by said illuminating means and transmitting means According to a selected program.

2. The combination of claim 1, including a source of electrical energy, said selector means connecting said source to said receiver means when the latter is selected for operation and a switch common to and forming part of all of said program means and also connecting said source to said illuminating means and transmitting means when said selector means selects one of said programs, drive means for driving said plurality of program means and connected by said selector means to said source when a given program is selected by said selector means, so that all of said program means are driven simultaneously, and adjustable means forming part of said selector means for transmitting electricity from a selected one of said program means to said illuminating means and transmitting means according to the adjusted position of said adjustable means, said selector means placing said adjustable means in a position for transmitting electricity from a selected one of said programs when said selector means selects a given program.

3. The combination of claim 1 wherein said selector means is in the form of a rotary selecting switch.

4. The combination of claim 2 wherein said selector switch means is in the form of a linearly movable selecting switch.

5. The combination of claim 2 wherein each program means includes a plurality of cams, said adjustable means including movable switches having contacts displaced by said cams to bring about a preselected program of operation and said switches being placed by said selector means in operative relationship with respect to a selected program means when a given program is selected.

6. The combination of claim 1 wherein said adjustable means is tiltable to swing to an adjusted position coacting with a selected program means, said selector means tilting said adjustable means to a selected position.

7. The combination of claim 2 wherein said transmitting means includes a generator for generating carrier wave and a modulator therefor for generating a given audiofrequency.

8. The combination of claim 7 wherein the vehicle includes an automobile battery which acts as a source of energy, said battery being operatively connected with said modulator.

9. The combination of claim 1 wherein a drive means is set into operation by said selector means when a given program is selected, each program means including a means for producing predetermined signals, and a switch means forming part of said selector means and having contacts actuated by a selected program means and operating the transmitting means and illuminating means according to the signals of the selected program.

10. The combination of claim 9 wherein the automotive vehicle includes a battery, said drive means being an electric motor connected to said battery as a source of energy by said selector means when the latter selects a given program.

11. The combination of claim 10 wherein a gear transmission is driven by said motor and operatively connected to said program means for driving the latter.

12. The combination of claim 9 wherein each program means includes a rotary disc and a plurality of cams carried thereby for providing a given set of signals.

13. The combination of claim 12 wherein said plurality of program means include a series of concentrically arranged cams located in a common plane.

14. The combination of claim 12 wherein said plurality of program means include a plurality of circularly arranged series of cams located on a common cylinder of said disc.

15. The combination of claim 12 wherein said switch means is tiltable to be placed by said selector means in cooperative relation with respect to a selected program means.

16. The combination of claim 1 wherein said transmitting means includes a generator for audiofrequency signals, said illuminating means providing intermittent light signals, and said transmitting means being operable for transmitting radio signals simultaneously with operation of an interruption of the operation of said illuminating means, said program means including an impulse oscillator circuit selected by said selector means.

17. The combination of claim 16 wherein the generator for the audiofrequency signals includes an electronic circuit forming a control impulse oscillator, an electronic circuit forming a continuous audio-oscillator, and a modulating amplifier for modulating the radio frequency wave generated by said transmitting means, said audiofrequency impulses being generated by said oscillators.

18. The combination of claim 17 wherein said control impulse oscillator includes a transistor and at least a pair of oscillator circuits selectively connected by said selector means, said control impulse oscillator generating control impulses, and a light signal amplifier circuit receiving the latter impulses, said control impulse oscillator also transmitting impulses to said continuous audio-oscillator.

19. The combination of claim 17 wherein said audio-oscillator includes a transistor and an oscillator circuit connected thereto and receiving impulses from said control impulse oscillator, and a modulating amplifier receiving signals from said audio-oscillator. according 20. The combination of claim 17 wherein said modulating amplifier includes an input transformer, a transistor, and an output transformer, said audio-oscillator feeding a signal to said amplifier and said impulse oscillator interrupting the impulses, said amplifier transmitting signals to said transmitter.

21. The combination of claim 16 wherein an electronic amplifier circuit is operatively connected with said illuminating means and with said impulse oscillator for amplifying impulses received from the latter, said amplifier including a transformer and a transistor.

22. The combination of claim 1 wherein said illuminating means includes a triangular housing having a transparent wall of frosted glass and housing in its interior an electric lamp, the automotive vehicle including a car battery which acts as the source of energy and which is electrically connected with the latter lamp, a control box housing the assembly and an electrical cord connected to said housing and having a terminal removably connected with a terminal at said control box.

* * * * *

UNITED STATES PATENT OFFICE
CERTIFICATE OF CORRECTION

Patent No. 3,646,508                    Dated February 29, 1972

Inventor(s) Jacinto Rocha Da Silva

It is certified that error appears in the above-identified patent and that said Letters Patent are hereby corrected as shown below:

Directly under the heading "Foreign Application Priority Data" the date should be --June 16, 1967--.

Signed and sealed this 27th day of June 1972.

(SEAL)
Attest:

EDWARD M. FLETCHER, JR.
Attesting Officer

ROBERT GOTTSCHALK
Commissioner of Patents